US009602816B2

(12) United States Patent
Wen et al.

(10) Patent No.: US 9,602,816 B2
(45) Date of Patent: Mar. 21, 2017

(54) VIDEO IMAGE CODING AND DECODING METHOD AND APPARATUS

(71) Applicant: Huawei Technologies Co., Ltd., Shenzhen, Guangdong (CN)

(72) Inventors: Xing Wen, Hong Kong (CN); Oscar Au, Hong Kong (CN); Haitao Yang, Shenzhen (CN); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 461 days.

(21) Appl. No.: 14/274,408

(22) Filed: May 9, 2014

(65) Prior Publication Data

US 2014/0247880 A1     Sep. 4, 2014

Related U.S. Application Data

(63) Continuation of application No. PCT/CN2012/083969, filed on Nov. 2, 2012.

(30) Foreign Application Priority Data

Nov. 11, 2011     (CN) .......................... 2011 1 0357726

(51) Int. Cl.
   *H04N 19/52*     (2014.01)
   *H04N 19/583*    (2014.01)
   *H04N 19/436*    (2014.01)

(52) U.S. Cl.
   CPC ..... *H04N 19/00733* (2013.01); *H04N 19/436* (2014.11); *H04N 19/52* (2014.11)

(58) Field of Classification Search
   CPC . H04N 19/00733; H04N 19/436; H04N 19/52
   See application file for complete search history.

(56) References Cited

U.S. PATENT DOCUMENTS

| 2008/0159400 A1* | 7/2008 | Lee .................. H04N 19/52 375/240.16 |
| 2009/0129472 A1 | 5/2009 | Panusopone et al. |

(Continued)

FOREIGN PATENT DOCUMENTS

| CN | 101686393 A | 3/2010 |
| CN | 101889405 A | 11/2010 |

(Continued)

OTHER PUBLICATIONS

Xing Wen, et al., "Non-CE9 Parallel Merge/skip Mode for HEVC", Hong Kong University of Science and Technology, Joint Collaborative Team on Video Coding (JCT-VC) of ITU-T SG16 WP3 and ISO/IEC JTC1/SC29/WG11, Nov. 21-30, 2011, 7 pages.

(Continued)

*Primary Examiner* — Peter D Le

(57) ABSTRACT

The present invention relates to a method for coding and decoding a video signal, and provides a method for coding a video signal, including: determining space adjacent motion information of a parallel motion processing region PR; determining time adjacent motion information of a current block, where the current block is located in the parallel motion processing region PR; determining a candidate motion information set according to the space adjacent motion information of the parallel motion processing region PR and the time adjacent motion information of the current block; selecting motion information of the current block from the candidate motion information set, and sending a motion information indication of the current block to a decoding end, so as to assist the decoding end in determining the motion information of the current block; and performing motion compensation coding for the current block according to the motion information of the current block.

23 Claims, 4 Drawing Sheets

(56) References Cited

U.S. PATENT DOCUMENTS

2009/0304084 A1    12/2009  Hallapuro et al.
2011/0188579 A1     8/2011  Lin et al.
2012/0134416 A1*    5/2012  Lin .................... H04N 19/52
                                                    375/240.16

FOREIGN PATENT DOCUMENTS

CN         102227132 A    10/2011
WO    WO 2011/115659 A1    9/2011

OTHER PUBLICATIONS

Xing Wen, et al., "Parallel Merge/skip Mode for HEVC", Hong Kong University of Science and Technology, Joint Collaborative Team on Video Coding (JCT-VC) of ITU-T SG16 WP3 and ISO/IEC JTC1/SC29/WG11, Nov. 21-30, 2011, 13 pages.

Yongjoon Park, et al., "Non-CE9: improvement on parallelized merge/skip mode", LG, Joint Collaborative Team on Video Coding (JCT-VC) of ITU-T SG16 WP3 and ISO/IEC JTC1/SC29/WG11, Nov. 19-30, 2011, 7 pages.

Il-Koo Kim, et al., "Experiments on tools in Working Draft (WD) and HEVC Test Mode (HM-3.0)", Samsung Electronics Co., Ltd. and Texas Instruments, Joint Collaborative Team on Video Coding (JCT-VC) of ITU-T SG16 WP3 and ISO/IEC JTC1/SC29/WG11, Jul. 14-22, 2011, 12 pages.

Minhua Zhou, "Parallelized merge/skip mode for HEVC", Joint Collaborative Team on Video Coding (JCT-VC) of ITU-T SG16 WP3 and ISO/IEC JTC1/SC29/WG11, Jul. 14-22, 2011, 13 pages.

Jingjing Dai, et al., "Motion Vector Coding based on Predictor Selection and Boundary-matching Estimation", MMSP'09, Oct. 5-7, 2009, 5 pages.

* cited by examiner

VIDEO IMAGE CODING AND DECODING METHOD AND APPARATUS

CROSS-REFERENCE TO RELATED APPLICATIONS

This application is a continuation of International Application No. PCT/CN2012/083969, filed on Nov. 2, 2012, which claims priority to Chinese Patent Application No. 201110357726.7, filed on Nov. 11, 2011, both of which are hereby incorporated by reference in their entireties.

TECHNICAL FIELD

Embodiments of the present invention relate to communications technologies, and in particular, to a method and an apparatus for video image coding and decoding processing.

BACKGROUND

An interframe predictive coding technology includes a plurality of coding technologies that are based on a candidate motion information set, such as a merge mode coding technology and an advanced motion vector prediction technology. A common point of these technologies is that these technologies construct a candidate motion information set for an image block currently under coding and decoding processing (which is called a current block for short), and select a piece of motion information from the candidate motion information set as motion information of the current block or as a predictive value of motion information of the current block. The motion information may include a motion vector and a predictive direction, and other information such as a reference image index. To enable a decoding end to obtain motion information selected by a coding end, the coding end needs to transmit the selected information to the decoding end. The coding end and the decoding end construct a candidate motion information set in the same way as the coding end; therefore, the decoding end can select, according to the received information about motion information selection and from the candidate motion information set, the same motion information as that of the coding end for a motion compensation operation. Motion information of a space adjacent block may be used when the candidate motion information set of the current block is constructed, in other words, the candidate motion information set of the current block can be constructed only after motion information of the space adjacent block has been determined. As a result, the coding technology based on the candidate motion information set cannot be simultaneously used for more than one image block.

SUMMARY

Embodiments of the present invention provide a method for coding and decoding a video signal, which can implement concurrent coding or decoding processing on multiple image blocks in a parallel motion processing region.

A method for coding a video signal includes:
determining space adjacent motion information of a parallel motion processing region PR;
determining time adjacent motion information of a current block, where the current block is located in the parallel motion processing region PR;
determining a candidate motion information set of the current block according to the space adjacent motion information of the parallel motion processing region PR and the time adjacent motion information of the current block;
selecting motion information of the current block from the candidate motion information set, and sending a motion information indication of the current block to a decoding end, so as to assist the decoding end in determining the motion information of the current block; and
performing motion compensation coding for the current block according to the motion information of the current block.

A method for decoding a video signal includes:
determining space adjacent motion information of a parallel motion processing region PR;
determining time adjacent motion information of a current block, where the current block is located in the parallel motion processing region PR;
determining a candidate motion information set of the current block according to the space adjacent motion information of the parallel motion processing region PR and the time adjacent motion information of the current block;
receiving a motion information indication sent by a coding end;
selecting motion information of the current block from the candidate motion information set according to the motion information indication, where the current block is located in the parallel motion processing region PR; and
performing motion compensation processing on the current block according to the motion information of the current block.

Further, an embodiment of the present invention further provides a codec or an apparatus for implementing the foregoing methods.

An apparatus for coding a video signal includes:
a motion information determining unit, configured to determine space adjacent motion information of a parallel motion processing region PR and time adjacent motion information of a current block, where the current block is located in the parallel motion processing region PR;
a candidate motion information set constructing unit, configured to determine a candidate motion information set of the current block according to the space adjacent motion information of the parallel motion processing region PR and the time adjacent motion information of the current block;
a motion information selecting unit, configured to select motion information of the current block from the candidate motion information set and send a motion information indication of the current block to a decoding end, so as to assist the decoding end in determining the motion information of the current block; and
a coding unit, configured to perform motion compensation coding for the current block according to the motion information of the current block.

An apparatus for decoding a video signal includes:
a motion information determining unit, configured to determine space adjacent motion information of a parallel motion processing region PR and time adjacent motion information of a current block, where the current block is located in the parallel motion processing region PR;
a candidate motion information set constructing unit, configured to determine a candidate motion information set of the current block according to the space adjacent motion information of the parallel motion processing region PR and the time adjacent motion information of the current block;
a receiving unit, configured to receive a motion information indication sent by a coding end;

a motion information selecting unit, configured to select motion information of the current block from the candidate motion information set according to the motion information indication; and a decoding unit, configured to perform motion compensation processing on the current block according to the motion information of the current block.

In a method or an apparatus of the embodiments of the present invention, a current block uses space adjacent motion information of a candidate motion information set of a parallel motion processing region where the current block is located, so that coding and decoding processing can be concurrently or simultaneously performed for a plurality of image blocks in the parallel motion processing region, improving coding and decoding efficiency. Further, because a candidate motion information set needs to be constructed only for a parallel motion processing region, not for each image block in the parallel motion processing region, complexity of video signal coding and decoding is also reduced.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show some embodiments of the present invention, and a person of ordinary skill in the art may still derive other drawings according to these accompanying drawings without creative efforts.

DETAILED DESCRIPTION

An embodiment of the present invention introduces an implementation manner of concurrently or simultaneously performing coding or decoding for a plurality of image blocks in a video signal. The video signal is processed by a coder or a decoder, so that better video signal communication or transmission can be implemented.

The coder or a video processing device performs coding or decoding processing on a received video signal. Generally, a processor performs coding or decoding processing on the video signal in a specific case.

Figure 1:
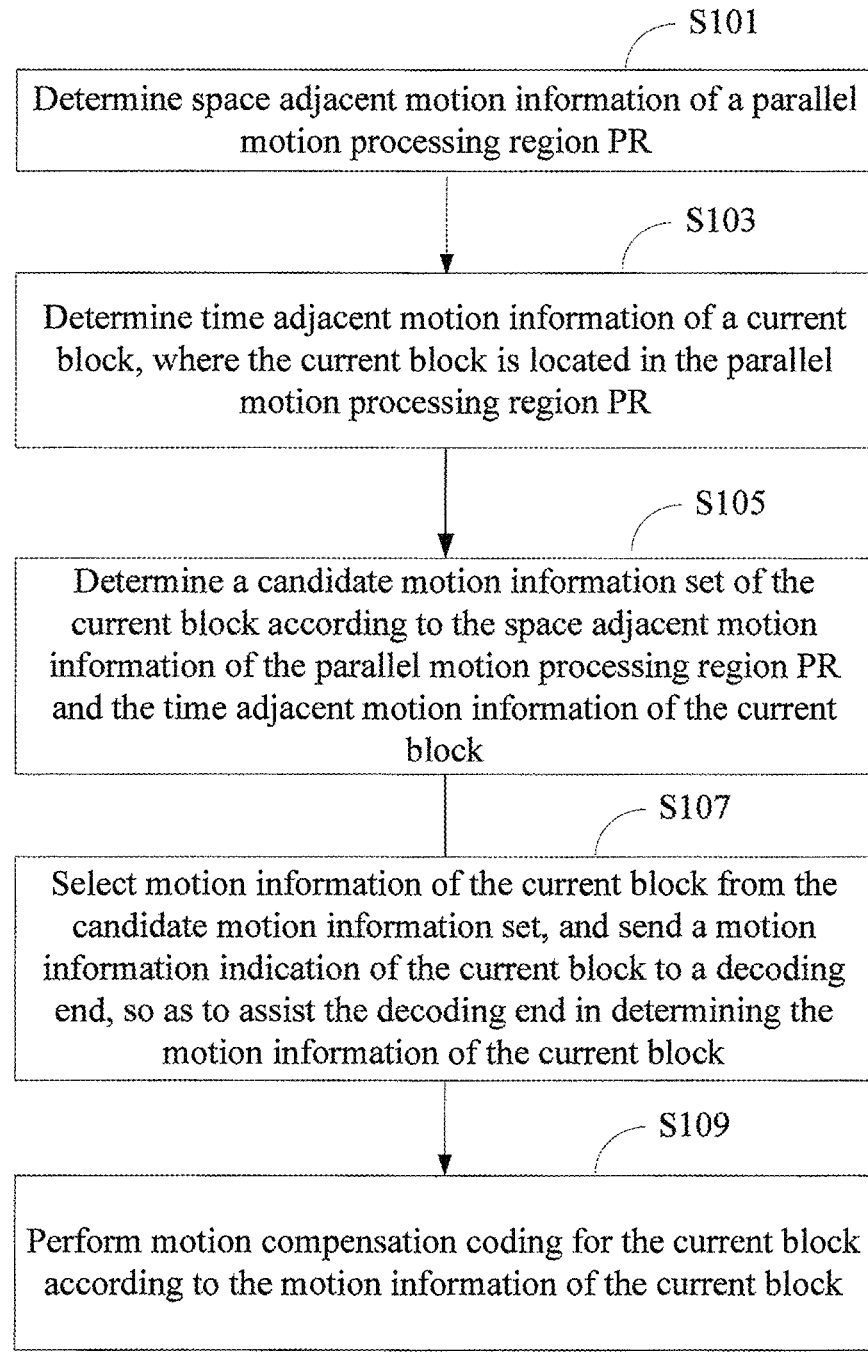
FIG. 1 is a flowchart of a video coding method according to an embodiment of the present invention.

Referring to FIG. 1, FIG. 1 is a flowchart of a video coding method according to an embodiment of the present invention.

S101. Determine space adjacent motion information of a parallel motion processing region (Parallel Region, PR).

A parallel motion processing region PR is a region of an image in a video signal, and can be set by using a parameter. All image blocks in each parallel motion processing region can be simultaneously coded and decoded by using a merge technology. Or in other words, the parallel processing region PR is a rectangular image block that includes a current block, and its size and shape are preset or are determined by information sent by a coding end.

S103. Determine time adjacent motion information of a current block, where the current block is located in the parallel motion processing region PR.

An image block currently under coding and decoding processing is known as a current block for short, and the parallel motion processing region PR is a region of an image in a video signal.

S105. Determine a candidate motion information set of the current block according to the space adjacent motion information of the parallel motion processing region PR and the time adjacent motion information of the current block.

S107. Select motion information of the current block from the candidate motion information set, and send a motion information indication of the current block to a decoding end, so as to assist the decoding end in determining the motion information of the current block.

In a practical application, the motion information indication may be an index numerical value (index value) of the selected motion information in the candidate motion information set. The coding end and the decoding end construct the candidate motion information set by using a same method; therefore, the decoding end can determine, by using an index, the motion information of the current block that is consistent with that at the coding end. As another implementation manner, specific motion information may also be sent to the decoding end as the motion information indication. The current block is an image block in the parallel motion processing region. As described above, the parallel motion processing region includes a plurality of image blocks, and in a practical process of processing a video signal, image blocks in a parallel motion processing region can concurrently or simultaneously serve as current blocks.

S109. Perform motion compensation coding for the current block according to the motion information of the current block.

The motion information may include a motion vector and a predictive direction, and may further include other information such as a reference image index.

The embodiment of the present invention introduces an example of performing coding for a video signal in a merge mode. Obviously, a technology of the present invention may be directly used for other coding technologies that are based on a candidate motion information set.

In a merge mode, motion information of a currently coded image block is inferred based on motion information of a peripheral reconstructed image block. The motion information may include a motion vector and a predictive direction, and may further include other information such as a reference image index. In a process of video processing, the motion information such as the motion vector and the predictive direction may not be transmitted for an image block that uses the merge mode.

Figure 2:
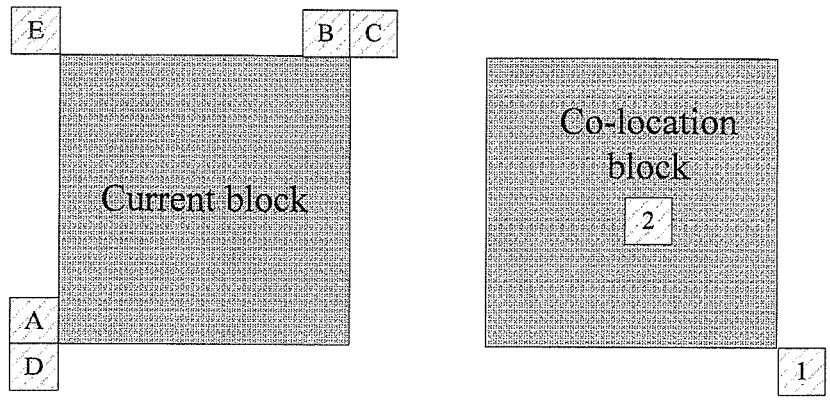
FIG. 2 is a schematic diagram of a method for constructing a candidate motion information set according to an embodiment of the present invention.

In the merge mode, a candidate motion information set is constructed and obtained based on the motion information of the peripheral reconstructed image block. FIG. 2 shows a method for constructing a candidate motion information set, where a current block is an image block being processed in a process of coding a current image, a co-location block refers to an image block that has a same size and same space coordinates as the current block in a time reference image of the current block, image blocks A, B, C, D, and E indicate space adjacent image blocks that can be used to construct a candidate motion information set, and image blocks 1 and 2 indicate time adjacent image blocks that can be used to construct the candidate motion information set. The motion information of any image block of the space adjacent image blocks and the time adjacent image blocks may be used as a piece of element motion information in the candidate motion information set. In a current HEVC solution, based on whether the adjacent image block exists and whether motion information of the adjacent image block exists, at most five adjacent image blocks are selected and motion information of these adjacent image blocks is used to form a candidate motion information set. During the process of constructing the candidate motion information set, it needs to be ensured that the obtained candidate motion information set does not include the same motion information. Specifically, whether motion information of corresponding space adjacent blocks exists may be sequentially checked in a sequence of A, B, C and D, and the obtainable motion information is added to the candidate motion information set. In this case, if the number of pieces of motion information in the set is less than 4, the motion information of block E is added. When the motion information of the time adjacent blocks is added, whether motion information of corresponding time adjacent blocks exists may be sequentially checked in a sequence of 1 and 2, and a first piece of obtainable motion information is added to the candidate motion information set. The co-location block of the current block is determined in a reference image of the current image, and motion information of a basic motion information unit in a lower right corner location (for example, image block 1 in FIG. 2) outside the co-location block is selected as time adjacent motion information of the current block. If the motion information of the basic motion information unit in the lower right corner location outside the co-location block does not exist, motion information of a basic motion information unit in a central location (for example, image block 2 in FIG. 2) of the co-location block is selected as the time adjacent motion information of the current block. The basic motion information unit is a minimum image block that stores and represents independent motion information, for example, it may be an image block of 4×4 in size.

A coding end selects, based on a rate distortion criterion, optimal motion information from the candidate motion information set as the motion information of the current block, and transmits an index value of the selected motion information in the candidate motion information set to a decoding end. The decoding end may construct the candidate motion information set by using a same method, and select, according to the index value obtained by decoding, correct motion information from the candidate motion information set, to perform a motion compensation operation on the current block.

Figure 3:
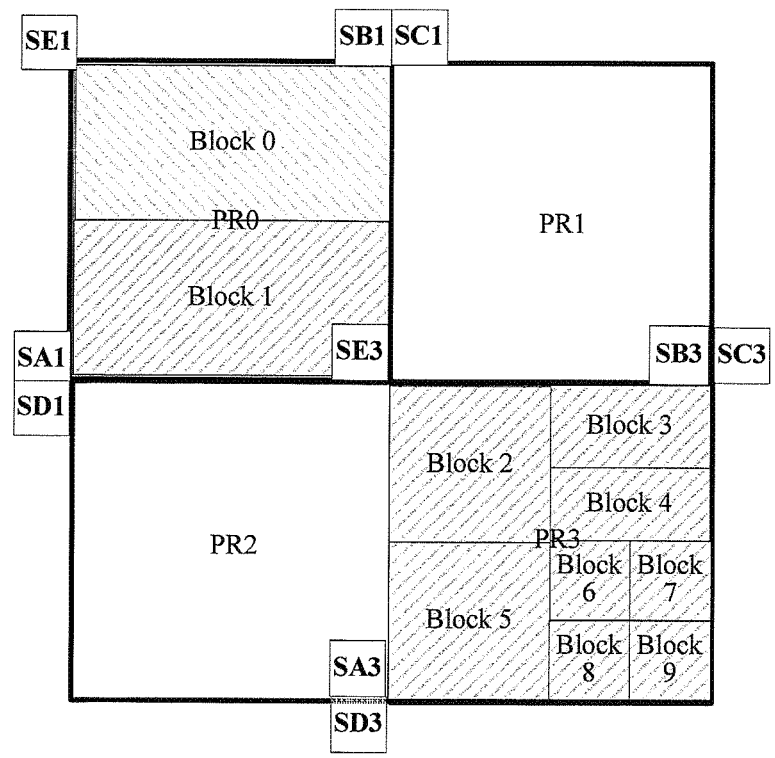
FIG. 3 is a schematic diagram of a parallel motion processing region and a space adjacent block according to an embodiment of the present invention.

Referring to FIG. 3, a square region in an image is divided into four square sub-regions, where each square sub-region is a parallel motion processing region, and the four square sub-regions are marked as PR0, PR1, PR2, and PR3. A size of the four square sub-regions may be preset by using a parameter, and a fixed size may also be used during setting of a coding and decoding system. In order to simultaneously perform a coding or decoding operation on all image blocks in each square sub-region by using the merge mode, the same candidate motion information set is used for each of the image blocks. The image block is obtained by means of dividing by the coding end, and it may be a square image block, and may also be a non-square image block. The coding or decoding operation may be independently performed on the image block by using the merge mode. For example, in the HEVC solution, the image block may be a prediction unit.

Determine space adjacent motion information for each parallel motion processing region (the square sub-region). For example, for parallel motion processing region PR0, check in sequence whether space adjacent image blocks SA1, SB1, SC1, SD1, and SE1 are obtainable, then check whether motion information of an obtainable image block is obtainable, and finally, use the obtainable motion information as the space adjacent motion information. If a space adjacent image block is located in a current coding image and may be used to assist in performing the coding or decoding operation on the current block, it is considered that the space adjacent image block is obtainable. If coding is performed for a certain space adjacent image block by using an interframe predictive coding mode, that is, coding information of the space adjacent image block includes the motion information, it is considered that the space adjacent image block is obtainable, and the motion information of the space adjacent block is added as the space adjacent motion information. Check, by using the same method, whether image blocks SA3, SB3, SC3, SD3, and SE3 are obtainable, so as to determine the space adjacent motion information of PR3. The space adjacent image block of a PR region is an image block that is in an adjacent location of the PR region and has been coded or decoded, and it may be an image block above the PR region, may be an image block on the left of the PR region, may be an image block on the upper left of the PR region, may be an image block on the lower left of the PR region, may be an image block on the upper right of the PR region, or may also be an image block in another location adjacent to the PR region. In an application, a same method may be used to determine the space adjacent motion information for each square sub-region, or a different method may also be used to determine the space adjacent motion information for each square sub-region.

Referring to FIG. 2, when each image block in the parallel motion processing region serves as the current block, its time adjacent motion information is determined. The co-location block of the current block is determined in a reference image of the current block, and the motion information of the basic motion information unit in the lower right corner location (image block 1) outside the co-location block is selected as the time adjacent motion information of the current block. If the motion information of the basic motion information unit in the lower right corner location outside the co-location block does not exist, the motion information of the basic motion information unit in the central location (image block 2) of the co-location block is selected as the time adjacent motion information of the current block. The motion information of the basic motion information unit in another location may also be selected, from an adjacent region inside or outside the co-location block, as the time adjacent motion information of the current block.

According to the foregoing method, the time adjacent motion information of the current block and the space adjacent motion information of the parallel motion processing region PR are determined, which form the candidate motion information set of the current block.

In this embodiment of the present invention, a candidate motion information set is constructed for the current block. An element of the candidate motion information set includes space adjacent motion information of the parallel motion processing region PR and time adjacent motion information of the current block. Candidate motion information sets of all image blocks in each parallel motion processing region all use the space adjacent motion information of the parallel motion processing region, and each image block determines its own time adjacent motion information. During implementation, one or more space adjacent image blocks are selected for the parallel motion processing region PR, and it is determined whether motion information of each space adjacent image block of the space adjacent image blocks exists; and if the motion information exists, the motion information of each space adjacent image block is used as an element of the candidate motion information set, and the determined motion information of the space adjacent image block is added to the candidate motion information set of each image block in the parallel motion processing region PR. Image blocks of each parallel motion processing region PR all may become the current block. One or more time adjacent image blocks are selected for the current block; it is determined whether motion information of each time adjacent image block of the one or more time adjacent image blocks exists; and if the motion information exists, the motion information of each time adjacent image block is used as an element of the candidate motion information set, and the motion information of the time adjacent image block of the current block is added to the candidate motion information set of the current block. Therefore, the candidate motion information set of each current block includes two parts: one part is the motion information of the time adjacent image block of the current block, and the other part is the space adjacent motion information of the parallel motion processing region PR where the current block is located.

Further, after the determination of the foregoing two parts is complete, an element may further be added to the candidate motion information set of the current block, that is, if the number of the elements that the candidate motion information set of the current block can accommodate is larger than the number of the calculated motion information elements, a method for constructing and obtaining one or more pieces of new motion information may be used. The following gives the method for constructing and obtaining one or more pieces of new motion information based on the space adjacent motion information of the parallel motion processing region PR and the time adjacent motion information of the current block: selecting first motion information and second motion information from the space adjacent motion information or time adjacent motion information, where the first motion information includes a forward motion vector and a corresponding forward reference image index, and the second motion information includes a backward motion vector and a corresponding backward reference image index; and combining the first motion information and the second motion information to obtain a piece of new motion information, bi-directional motion information, where the forward motion vector in the bi-directional motion information is the forward motion vector of the first motion information, the forward reference image index in the bi-directional motion information is the forward reference image index of the first motion information, the backward motion vector in the bi-directional motion information is the backward motion vector of the first motion information, and the backward reference image index in the bi-directional motion information is the backward reference image index of the first motion information. Besides the foregoing method, the new motion information may also be constructed in a manner of directly adding zero motion information.

Further, a duplicate element of the candidate motion information set may also be removed, so that elements in the candidate motion information set are different from each other.

For example, for each image block in the parallel motion processing region PR3, for example, blocks 2 to 9 in MR3, the following operations may be concurrently or simultaneously performed to continue to perform coding processing.

S1021. Calculate rate distortion cost obtained by performing motion compensation coding, by using the motion information indicated by each element of the candidate motion information set of the current block, for the image block that the motion information belongs to. A minimum rate distortion cost RdCost can be calculated according to RdCost=D+lambda×R, where R is a bit cost brought by the motion compensation coding, D is a deviation between a signal of an image block reconstructed by coding and a signal of an original image block, and lambda is a preset coding parameter. Or in other words, the foregoing process of calculating the rate distortion cost may be: performing motion compensation for the image block by using the motion information and calculating an error signal of the motion compensation; performing space transformation, quantization, and entropy coding for the error signal, and calculating an coding rate of the image block; reconstructing a signal of the image block and calculating signal distortion; and calculating the rate distortion cost according to the signal distortion and coding rate of the image block signal.

S1022. Select the motion information that has the minimum rate distortion cost as optimal motion information of the current block.

S1023. Transmit an index value of the optimal motion information in the candidate motion information set to a decoding end.

Further, other coding information of the current block may further be transmitted to the decoding end, where the other coding information includes coding information of the error signal of the current block and coding mode information of the current block, and the like. For an entire coding and decoding system, coding and decoding process may be designated by appointment or fixed. In this case, the foregoing other coding information may not be transmitted. In a specific scenario, the other coding information may also be sent, so that the decoding end uses the same video signal processing mode.

In the method for coding a video signal according to this embodiment of the present invention, all image blocks in the parallel motion processing region use a same candidate motion information set; therefore, an operation of determining space adjacent motion information needs to be performed only once, and all image blocks can use the space adjacent motion information obtained by determining. Because the number of operations of determining the space adjacent motion information is reduced, implementation complexity can be reduced. Further, all motion information of a candidate motion information set of a current image block is obtained from a time adjacent image block or a space adjacent image block outside a square sub-region, but motion information of an image block of the square sub-region is not included. Therefore, it is unnecessary to determine whether the space adjacent image block corresponding to each piece of motion information in the candidate motion information set is located in the same parallel motion processing region as the current image block. From the perspective of hardware, determination operations can be reduced when each image block is processed, thereby reducing a system delay and circuit cost.

Figure 4:
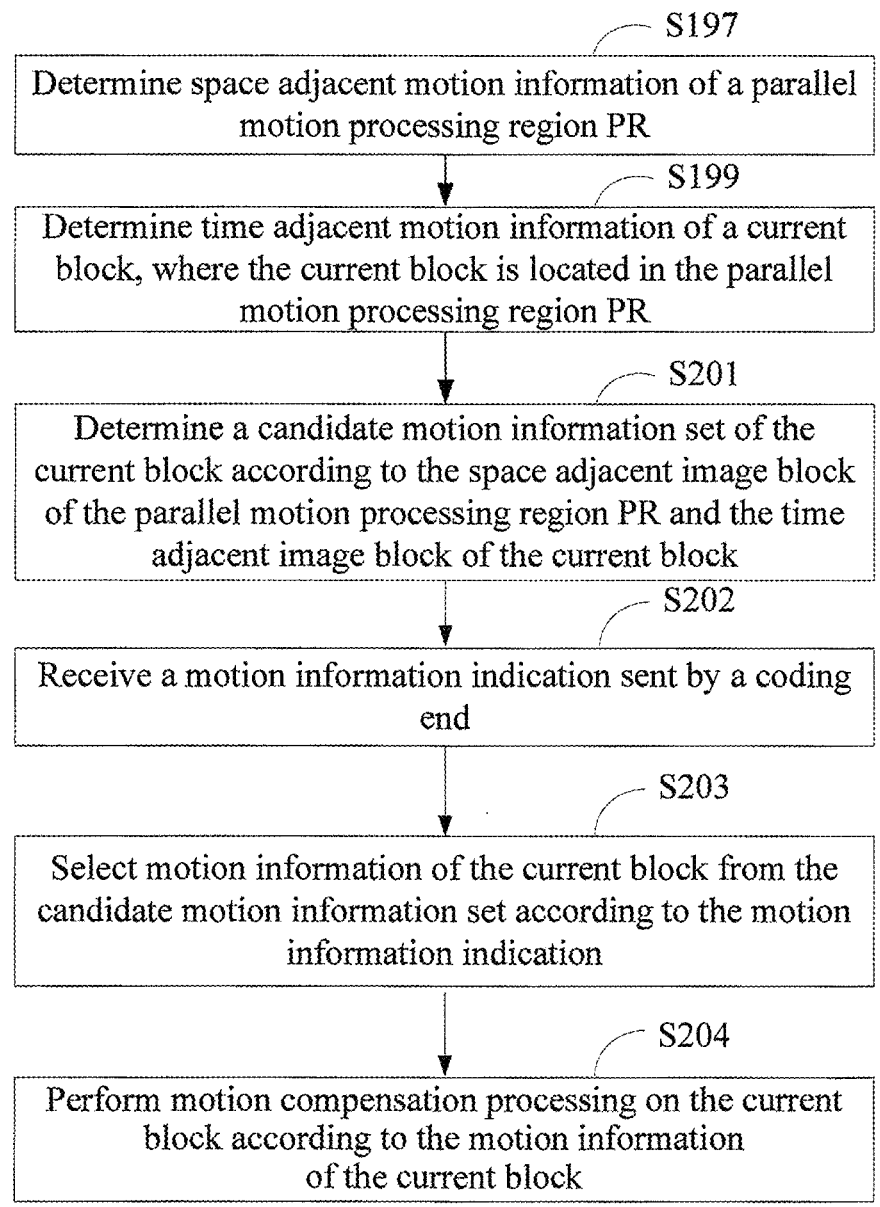
FIG. 4 is a flowchart of a video decoding method according to an embodiment of the present invention.

In addition, an embodiment of the present invention introduces a method for decoding a video signal at a decoding end, a peer end of the foregoing coding method. Referring to FIG. 4. FIG. 4 is a flowchart of a video decoding method in this embodiment of the present invention.

S197. Determine space adjacent motion information of a parallel motion processing region PR.

S199. Determine time adjacent motion information of a current block, where the current block is located in the parallel motion processing region PR.

S201. Determine a candidate motion information set of the current block according to the space adjacent image block of the parallel motion processing region PR and the time adjacent image block of the current block.

S202. Receive a motion information indication sent by a coding end.

If the candidate motion information set includes only one element or is empty, the coding end does not send the motion information indication, and therefore, the decoding end does not need to receive the motion information indication.

S203. Select the motion information of the current block from the candidate motion information set according to the motion information indication.

S204. Perform motion compensation processing on the current block according to the motion information of the current block.

This embodiment of the present invention is a process of performing decoding processing on the video signal obtained by using the foregoing coding method. At the decoding end, a candidate motion information set is constructed for each current block by using the same method as that of the coding end. If the motion information indication of the current block includes an index value of an element of the motion information of the current block in the candidate motion information set, the selecting the motion information of the current block from the candidate motion information set according to the motion information indication includes: finding a corresponding element from the candidate motion information set according to the index value, and using the motion information indicated by the element as the motion information of the current block. If the motion information indication of the current block directly indicates the element of the motion information of the current block, the selecting the motion information of the current block from the candidate motion information set according to the motion information indication includes: finding the element from the candidate motion information set, and using the motion information indicated by the element as the motion information of the current block.

In a specific process of constructing a candidate motion information set, the time adjacent motion information and space adjacent motion information are separately determined, where the space adjacent motion information may be determined in a plurality of implementation manners. The decoding end may determine the space adjacent motion information for one time before the image block in a parallel motion processing region PR is processed, and when each image block that uses a merge mode in the parallel motion processing region serves as the current block, each image block uses the determined space adjacent motion information of the parallel motion procession region PR. The space adjacent motion information of the parallel motion processing region PR may further be determined for one time when the image block that uses the merge mode in the parallel motion processing region PR is processed for the first time, and subsequently, in the parallel motion processing region, other image blocks that use the merge mode directly use the determined space adjacent motion information when they are processed. In another implementation manner, when each image block that uses the merge mode in the parallel motion processing region serves as the current block, the space adjacent motion information of the parallel motion processing region where the image block is located is determined for one time, and obviously, in this case, the space adjacent motion information determined for all image blocks that use the merge mode in the parallel motion procession region is the same, that is, the space adjacent motion information of the parallel motion processing region.

In the method for decoding a video signal according to this embodiment of the present invention, a candidate motion information set is constructed, by using the same space adjacent motion information, for all image blocks that use a merge mode in a parallel motion processing region; therefore, an operation of determining the space adjacent motion information needs to be performed only once, and all the image blocks can use the determined space adjacent motion information of the parallel motion processing region. Because the number of operations of constructing the candidate motion information set is reduced, implementation complexity can be reduced. Further, all motion information of a candidate motion information set of a current image block is obtained from a time adjacent image block or a space adjacent image block outside a square sub-region, but motion information of an image block of the square sub-region is not included. Therefore, it is unnecessary to determine whether the space adjacent image block corresponding to each piece of motion information in the candidate motion information set is located in the same parallel motion processing region as the current image block. From the perspective of hardware, determination operations can be reduced when each image block is processed, thereby reducing a system delay and circuit cost.

In addition, an embodiment of the present invention further provides an apparatus for implementing the foregoing coding and decoding methods. The apparatus may be a coding or decoding processor, may be a mobile phone, a computer, a set top box, or the like apparatus that includes a coding and decoding processing unit, and may even be a processor (processor). A coding or decoding apparatus of the present invention is configured to implement the foregoing coding and decoding methods. Each step and function of the methods may be implemented in the apparatus and all specific details about steps may be executed in the apparatus. Therefore, for all details about a process executed by a specific apparatus, reference may be made to the method embodiment part.

Figure 5:
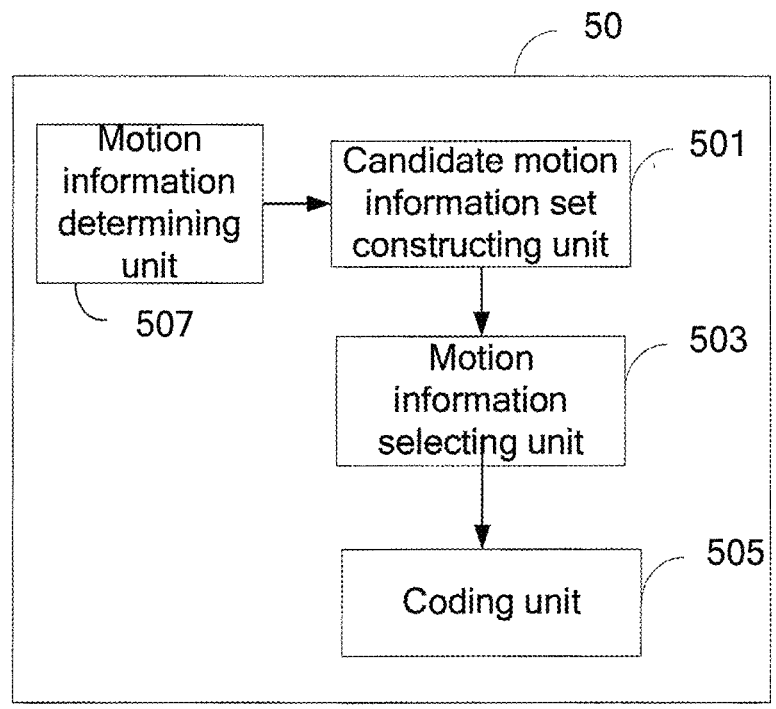
FIG. 5 is a schematic structural diagram of an apparatus for coding a video signal according to an embodiment of the present invention.

Referring to FIG. 5, an apparatus 50 for coding a video signal according to an embodiment of the present invention includes:

a motion information determining unit 507, configured to determine space adjacent information of a parallel motion processing region PR and time adjacent motion information of a current block, where the current block is located in the parallel motion processing region PR;

a candidate motion information set constructing unit 501, configured to determine a candidate motion information set of the current block according to the space adjacent motion information of the parallel motion processing region PR and the time adjacent motion information of the current block;

a motion information selecting unit 503, configured to select motion information of the current block from the candidate motion information set and send a motion information indication of the current block to a decoding end, so as to assist the decoding end in determining the motion information of the current block, where the current block is located in the parallel motion processing region PR; and a coding unit 505, configured to perform motion compensation coding for the current block according to the motion information of the current block.

Further, the motion information determining unit 507 selects one or more space adjacent image blocks for the parallel motion processing region PR, determines whether motion information of each space adjacent image block of the one or more space adjacent image blocks exists, and if the motion information exists, uses the motion information of each space adjacent image block as an element of the candidate motion information set; and selects one or more time adjacent image blocks for the PR of the current block, determines whether motion information of each time adjacent image block of the one or more time adjacent image blocks exists, and if the motion information exists, uses the motion information of each time adjacent image block as an element of the candidate motion information set.

The candidate motion information set constructing unit 501 is further configured to remove a duplicate element from the candidate motion information set, so that elements in the candidate motion information set are different from each other.

Further, that the motion information determining unit 507 is configured to determine whether motion information of each space adjacent image block of the one or more space adjacent image blocks exists includes that: if the space adjacent image block is located in a coded image where the current block is located and may be used to assist in performing a coding operation on the current block, the space adjacent image block is obtainable, and the motion information determining unit 507 determines, after detecting the motion information of the space adjacent image block, that the motion information of the space adjacent image block exists; and if the time adjacent image block is located in a reference image of the current block and may be used to assist in performing the coding operation on the current block, the time adjacent image block is obtainable, and the motion information determining unit 507 determines, after detecting the motion information of the time adjacent image block, that the motion information of the time adjacent image block exists.

That the motion information selecting unit 503 is configured to select the motion information of the current block from the candidate motion information set includes: performing motion compensation coding for the current block by using the motion information indicated by each element of the candidate motion information set, and calculating a rate distortion cost; and selecting the motion information indicated by an element that has a minimum rate distortion cost as the motion information of the current block. The motion information indication of the current block sent by the motion information selecting unit 503 includes an index value of the element of the motion information of the current block in the candidate motion information set. That the motion information selecting unit 503 is configured to send the motion information indication of the current block to a decoding end, so as to assist the decoding end in determining the motion information of the current block includes: sending the index value of the element that includes the motion information of the current block in the candidate motion information set to the decoding end, so as to assist the decoding end in determining the motion information of the current block.

The coding apparatus 50 further includes a sending unit (not shown in the diagram), configured to send coding information of an error signal of the current block and coding mode information of the current block to the decoding end, so that the decoding end can obtain, by recovering, a reconstructed signal of the current block.

Figure 6:
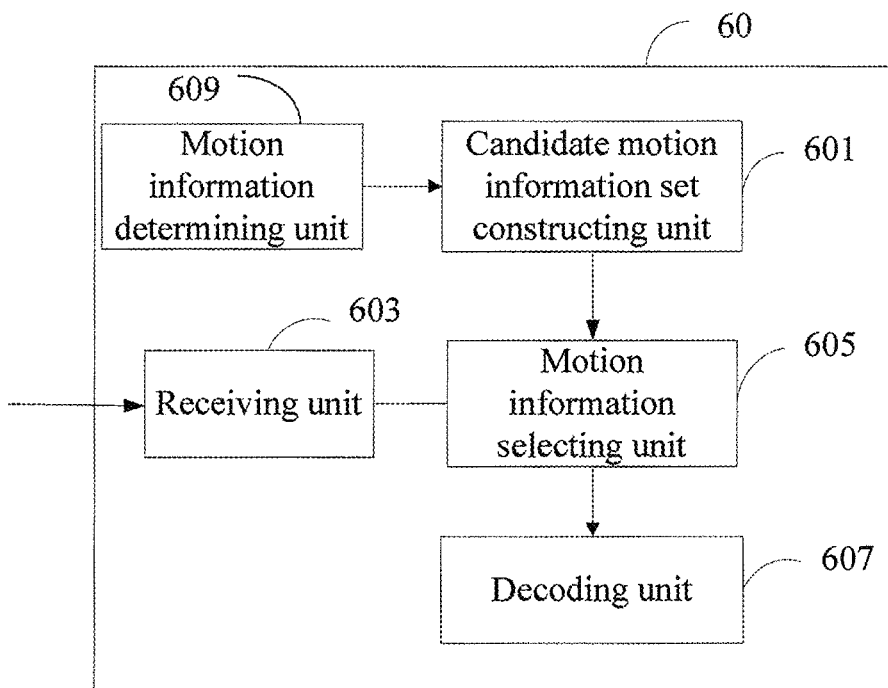
FIG. 6 is a schematic structural diagram of an apparatus for decoding a video signal according to an embodiment of the present invention.

Further, an embodiment of the present invention further discloses an apparatus for decoding a video signal. Referring to FIG. 6, FIG. 6 is a schematic diagram of an apparatus 60 for decoding a video signal according to the embodiment of the present invention. The apparatus includes:

a motion information determining unit 609, configured to determine space adjacent motion information of a parallel motion processing region PR and time adjacent motion information of a current block, where the current block is located in the parallel motion processing region PR;

a candidate motion information set constructing unit 601, configured to determine a candidate motion information set of the current block according to the space adjacent motion information of the parallel motion processing region PR and the time adjacent motion information of the current block;

a receiving unit 603, configured to receive a motion information indication sent by a coding end;

a motion information selecting unit 605, configured to select motion information of the current block from the candidate motion information set according to the motion information indication; and a decoding unit 607, configured to perform motion compensation processing on the current block according to the motion information of the current block.

Further, the motion information determining unit 609 selects one or more space adjacent image blocks for the parallel motion processing region PR and determines whether motion information of each space adjacent image block of the one or more space adjacent image blocks exists, and if the motion information exists, uses the motion information of each space adjacent image block as an element of the candidate motion information set; selects one or more time adjacent image blocks for the current block; and determines whether motion information of each time adjacent image block of the one or more time adjacent image blocks exists, and if the motion information exists, uses the motion information of each time adjacent image block as an element of the candidate motion information set. The candidate motion information set constructing unit 601 is further configured to remove a duplicate element from the candidate motion information set, so that elements in the candidate motion information set are different from each other.

Further, that the motion information determining unit 609 is configured to determine whether motion information of each space adjacent image block of the one or more space adjacent image blocks exists includes that: if the space adjacent image block is located in a decoded image where the current block is located and may be used to assist in performing a decoding operation on the current block, the space adjacent image block is obtainable, and the motion information determining unit 609, after detecting the motion information of the space adjacent image block, that the motion information of the space adjacent image block exists. The motion information determining unit 609 selects one or more time adjacent image blocks for the current block, and determines whether motion information of each time adjacent image block of the one or more time adjacent image blocks exists; and if the motion information exists, the motion information determining unit uses the motion information of each time adjacent image block as a piece of the time adjacent motion information. The candidate motion information set constructing unit uses each piece of the space adjacent motion information as an element of the candidate motion information set of the current block, and uses each piece of the time adjacent motion information as an element of the candidate motion information set of the current block.

If the motion information indication of the current block received by the receiving unit 603 includes an index value of the element of the motion information of the current block in the candidate motion information set, that the motion information selecting unit 605 is configured to select the motion information of the current block from the candidate motion information set according to the motion information indication includes that: the motion information selecting unit finds a corresponding element from the candidate motion information set according to the index value, and uses the motion information indicated by the element as the motion information of the current block.

In the apparatus for coding and decoding a video signal of the embodiments of the present invention, the same candidate motion information set is used for all image blocks in a parallel motion processing region; therefore, an operation of determining space adjacent motion information is required for only one time and all the image blocks can use the determined space adjacent motion information. Because the number of operations of determining the space adjacent motion information is reduced, implementation complexity can be reduced. Further, all motion information of a candidate motion information set of a current image block is obtained from a time adjacent image block or a space adjacent image block outside a square sub-region, but motion information of an image block of the square sub-region is not included. Therefore, it is unnecessary to determine whether the space adjacent image block corresponding to each piece of motion information in the candidate motion information set is located in the same parallel motion processing region as the current image block. From the perspective of hardware, determination operations can be reduced when each image block is processed, thereby reducing a system delay and circuit cost.

The described apparatus embodiment is merely exemplary. The units described as separate parts may or may not be physically separate, and parts displayed as units may or may not be physical units, may be located in one position, or may be distributed on at least two network units. A part or all of the modules may be selected according to actual needs to achieve the objectives of the solutions of the embodiments. A person of ordinary skill in the art may understand and implement without creative efforts.

What is claimed is:

1. A method for coding a video signal, the method comprising:
   determining space adjacent motion information of a parallel motion processing region, the parallel motion processing region comprising multiple image blocks, the space adjacent motion information being the same for all of the multiple image blocks of the parallel motion processing region;
   determining time adjacent motion information of a current block among the multiple image blocks, wherein the current block is located in the parallel motion processing region;
   determining a candidate motion information set of the current block according to the space adjacent motion information of the parallel motion processing region and the time adjacent motion information of the current block;
   selecting motion information of the current block from the candidate motion information set, and sending a motion information indication of the current block to a decoding end, so as to assist the decoding end in determining the motion information of the current block; and
   performing motion compensation coding for the current block according to the motion information of the current block.

2. The method according to claim 1, wherein determining space adjacent motion information of a parallel motion processing region comprises:
   selecting one or more space adjacent image blocks for the parallel motion processing region, determining whether motion information of each space adjacent image block of the one or more space adjacent image blocks exists, and if the motion information exists, using the motion information of each space adjacent image block as a piece of the space adjacent motion information.

3. The method according to claim 1, wherein determining time adjacent motion information of a current block comprises:
   selecting one or more time adjacent image blocks for the current block, determining whether motion information of each time adjacent image block of the one or more time adjacent image blocks exists, and if the motion information exists, using the motion information of each time adjacent image block as a piece of the time adjacent motion information.

4. The method according to claim 1, wherein determining a candidate motion information set of the current block according to the space adjacent motion information of the parallel motion processing region and the time adjacent motion information of the current block comprises:
   using each piece of the space adjacent motion information as an element of the candidate motion information set of the current block; and
   using each piece of the time adjacent motion information as an element of the candidate motion information set of the current block.

5. The method according to claim 1, wherein determining a candidate motion information set of the current block according to the space adjacent motion information of the parallel motion processing region and the time adjacent motion information of the current block further comprises:
   constructing and obtaining one or more pieces of new motion information based on the space adjacent motion information of the parallel motion processing region and the time adjacent motion information of the current block; and
   using each piece of the new motion information as an element of the candidate motion information set of the current block.

6. The method according to claim 1, wherein selecting motion information of the current block from the candidate motion information set comprises:
   performing motion compensation coding for the current block by using the motion information indicated by each element of the candidate motion information set, and calculating a rate distortion cost; and
   selecting motion information indicated by an element that has a minimum rate distortion cost as the motion information of the current block.

7. A method for decoding a video signal, the method comprising:

determining space adjacent motion information of a parallel motion processing region, the parallel motion processing region comprising multiple image blocks, the space adjacent motion information being the same for all of the multiple image blocks of the parallel motion processing region;

determining time adjacent motion information of a current block among the multiple image blocks, wherein the current block is located in the parallel motion processing region;

determining a candidate motion information set of the current block according to the space adjacent motion information of the parallel motion processing region and the time adjacent motion information of the current block;

receiving a motion information indication sent by a coding end;

selecting the motion information of the current block from the candidate motion information set according to the motion information indication; and performing motion compensation processing on the current block according to the motion information of the current block.

8. The method according to claim 7, wherein determining space adjacent motion information of a parallel motion processing region comprises:

selecting one or more space adjacent image blocks for the parallel motion processing region, determining whether motion information of each space adjacent image block of the one or more space adjacent image blocks exists, and if the motion information exists, using the motion information of each space adjacent image block as a piece of the space adjacent motion information.

9. The method according to claim 7, wherein determining time adjacent motion information of a current block comprises:

selecting one or more time adjacent image blocks for the current block, determining whether motion information of each time adjacent image block of the one or more time adjacent image blocks exists, and if the motion information exists, using the motion information of each time adjacent image block as a piece of the time adjacent motion information.

10. The method according to claim 8, wherein determining whether motion information of each space adjacent image block of the one or more space adjacent image blocks exists comprises:

if decoding is performed for a certain space adjacent image block by using an interframe predictive decoding mode, decoding information of the space adjacent image block comprises the motion information, and it is determined that the motion information of the space adjacent image block exists.

11. The method according to claim 9, wherein determining whether motion information of each time adjacent image block of the one or more time adjacent image blocks exists comprises:

if decoding is performed for a certain time adjacent image block by using an interframe predictive decoding mode, decoding information of the time adjacent image block comprises the motion information, and it is determined that the motion information of the time adjacent image block exists.

12. An apparatus for coding a video signal, the apparatus comprising:

at least one processor configured to:

determine space adjacent motion information of a parallel motion processing region and time adjacent motion information of a current block, wherein the parallel motion processing region comprising multiple image blocks, the space adjacent motion information is the same for all of the multiple image blocks of the parallel motion processing region, and the current block is one of the multiple image blocks located in the parallel motion processing region;

determine a candidate motion information set of the current block according to the space adjacent motion information of the parallel motion processing region and the time adjacent motion information of the current block;

select motion information of the current block from the candidate motion information set and send a motion information indication of the current block to a decoding end, so as to assist the decoding end in determining the motion information of the current block; and perform motion compensation coding for the current block according to the motion information of the current block.

13. The apparatus according to claim 12, wherein the at least one processor is further configured to:

select one or more space adjacent image blocks for the parallel motion processing region, determine whether motion information of each space adjacent image block of the one or more space adjacent image blocks exists, and if the motion information exists, use the motion information of each space adjacent image block as a piece of the space adjacent motion information.

14. The apparatus according to claim 12, wherein the at least one processor is further configured to:

select one or more time adjacent image blocks for the current block, determine whether motion information of each time adjacent image block of the one or more time adjacent image blocks exists, and if the motion information exists, use the motion information of each time adjacent image block as a piece of the time adjacent motion information.

15. The apparatus according to claim 13, wherein the at least one processor is further configured to:

if the space adjacent image block is located in a coded image where the current block is located and may be used to assist in performing a coding operation on the current block, the space adjacent image block is obtainable, determine, after detecting the motion information of the space adjacent image block, that the motion information of the space adjacent image block exists.

16. The apparatus according to claim 14, wherein the at least one processor is further configured to:

if the time adjacent image block is located in a reference image of the current block and may be used to assist in performing a coding operation on the current block, the time adjacent image block is obtainable, determine, after detecting the motion information of the time adjacent image block, that the motion information of the time adjacent image block exists.

17. An apparatus for decoding a video signal, the apparatus comprising:

at least one processor configured to:

determine space adjacent information of a parallel motion processing region and time adjacent motion information of a current block, wherein the parallel motion processing region comprising multiple image blocks, the space adjacent motion information is the same for all of the multiple image blocks of the parallel motion processing region, and the current block is one of the multiple image blocks located in the parallel motion processing region;

determine a candidate motion information set of the current block according to the space adjacent motion information of the parallel motion processing region and the time adjacent motion information of the current block;

receive a motion information indication sent by a coding end;

select motion information of the current block from the candidate motion information set according to the motion information indication; and perform motion compensation processing on the current block according to the motion information of the current block.

18. The apparatus according to claim 17, wherein the at least one processor is further configured to:

select one or more space adjacent image blocks for the parallel motion processing region, determine whether motion information of each space adjacent image block of the one or more space adjacent image blocks exists, and if the motion information exists, use the motion information of each space adjacent image block as a piece of the space adjacent motion information.

19. The apparatus according to claim 17, wherein the at least one processor is further configured to:

select one or more time adjacent image blocks for the current block; and determine whether motion information of each time adjacent image block of the one or more time adjacent image blocks exists, and if the motion information exists, use the motion information of each time adjacent image block as a piece of the time adjacent motion information.

20. The apparatus according to claim 17, wherein the at least one processor is further configured to:

use each piece of the space adjacent motion information as an element of the candidate motion information set of the current block, and use each piece of the time adjacent motion information as an element of the candidate motion information set of the current block.

21. The apparatus according to claim 18, wherein the at least one processor is further configured to:

if decoding is performed for a certain space adjacent image block by using an interframe predictive decoding mode, decoding information of the space adjacent image block comprises the motion information, determine that the motion information of the space adjacent image block exists.

22. The apparatus according to claim 19, wherein the at least one processor is further configured to:

if decoding is performed for a certain time adjacent image block by using an inter frame predictive decoding mode, decoding information of the time adjacent image block comprises the motion information, determine that the motion information of the time adjacent image block exists.

23. The apparatus according to claim 18, wherein the at least one processor is further configured to:

construct and obtain one or more pieces of new motion information based on the space adjacent motion information of the parallel motion processing region and the time adjacent motion information of the current block; and use each piece of the new motion information as an element of the candidate motion information set of the current block.

\* \* \* \* \*